(12) United States Patent
Battenberg (10) Patent No.: US 8,364,435 B2
(45) Date of Patent: Jan. 29, 2013

(54) DEVICE AND A METHOD FOR TESTING THE DESIGN OF A SEAT COMPRISING A SEAT AREA, A BACKREST, AND A HEADREST

(76) Inventor: Günther Battenberg, Marburg (DE)

( * ) Notice: Subject to any disclaimer, the term of this patent is extended or adjusted under 35 U.S.C. 154(b) by 290 days.

(21) Appl. No.: 12/698,633

(22) Filed: Feb. 2, 2010

(65) Prior Publication Data

US 2010/0204954 A1   Aug. 12, 2010

(30) Foreign Application Priority Data

Feb. 11, 2009   (DE) .......................... 10 2009 008 546

(51) Int. Cl.
*G01L 1/00* (2006.01)
*G01L 3/00* (2006.01)
*G01L 5/00* (2006.01)
*G01L 25/00* (2006.01)
*G01M 17/00* (2006.01)

(52) U.S. Cl. .......... 702/113; 702/41; 702/127; 702/150; 702/151

(58) Field of Classification Search .................. 702/113, 702/41, 127, 150, 151
See application file for complete search history.

(56) References Cited

U.S. PATENT DOCUMENTS

| | | | | |
|---|---|---|---|---|
| 4,304,439 | A | * | 12/1981 | Terada et al. ................. 297/409 |
| 5,703,303 | A | * | 12/1997 | Stewart ........................ 73/866.4 |
| 5,752,742 | A | * | 5/1998 | Kerner et al. ................. 297/391 |
| 6,019,424 | A | * | 2/2000 | Ruckert et al. ........... 297/216.12 |
| 6,131,436 | A | * | 10/2000 | O'Bannon et al. .................. 73/7 |

* cited by examiner

*Primary Examiner* — Janet Suglo
(74) *Attorney, Agent, or Firm* — Boyle Fredrickson, S.C.

(57) ABSTRACT

A method and a device are provided for testing the design of a seat comprising a seat area, a backrest, and a headrest. The method includes positioning a body simulating element with a reference measuring point on the seat by means of a robot kinematics; passive switching of the robot kinematics; measuring a distance between the reference measuring point and the headrest; and comparing the measured distance with a reference value.

17 Claims, 14 Drawing Sheets

DEVICE AND A METHOD FOR TESTING THE DESIGN OF A SEAT COMPRISING A SEAT AREA, A BACKREST, AND A HEADREST

BACKGROUND OF THE INVENTION

1. Field of the Invention

The present invention relates to a method and to a device for testing the design of a seat comprising a seat area, a backrest, and a headrest. On the substantially horizontally oriented seat area, a substantially vertically extending backrest is arranged on the rear edge, the backrest being either fixed to or adjustable around an angular section. The upper edge of the backrest has arranged thereon an adjustable headrest having bars that are shiftable in headrest exit openings in the backrest. The distance of the headrest from the upper edge of the backrest is variable so that the headrest can be adjusted to a passenger's size. In some seat models, the inclination of the headrest relative to the horizontal is adjustable by way of a pivotable movement of the headrest, so that the distance between the front side of the headrest and the back of a passenger's head is adjustable. The clearance between headrest and passenger's head is also called backset and also depends on the design of the seat. Since the distance between head and headrest is a decisive safety criterion, seats are checked within the scope of quality assurance with respect to their design.

2. Description of the Related Art

A manual method for performing the backset measurement is known, in which a dummy that is to simulate a passenger's size and height is put under specific conditions on the seat to be tested. This procedure is force- and time-consuming. The dummy is provided in the center of its head with a probe that consists of a rail extending in the direction of travel and of a ball segment arranged on the rear end thereof, which is to simulate the back of a head. To measure the backset, the probe is moved to the headrest and the distance is read by an operator from a ruler positioned on the rail. The manual backset measurement is only carried out by taking random samples, so that the design of the seat in consideration of manufacturing tolerances can only be carried out in an inadequate manner. The reason is that, apart from the constructional design, manufacturing tolerances also influence the final design of a seat leaving the production process.

SUMMARY OF THE INVENTION

It is an object of the present invention to provide a method for testing the design of a seat comprising a seat area, a backrest, and a headrest, which method is carried out in an efficient and reproducible manner. It is a further object of the present invention to provide a device for carrying out such a method.

According to the invention the object is achieved with a method comprising: positioning a body simulating element with a reference measuring point on the seat to be tested by means of a robot kinematics; passive switching of the robot kinematics; measuring a distance between the reference measuring point and the headrest; and comparing the measured distance with a reference value.

As a rule, positioning by means of robot kinematics comprises moving the body simulating element towards the seat and placing the element on the seat. The body simulating element is to simulate a human body that is seated with a predetermined weight on the seat area, leaning against the backrest with a predetermined force and carrying one's head at a specific height.

To this end the body simulating element has a multipart structure, with the part coming to rest on the seat area possibly comprising two bulges extending in parallel with the longitudinal seat direction to simulate thighs, and the part coming to rest on the backrest being possibly configured as a broad and flat plate to simulate a back, so that during testing of the design of the seat the predetermined weight of the body simulating element is acting on the seat in conformity with reality. Preferably, the part that rests on the seat area and the part that adjoins the backrest are hingedly connected to each other so that they can be pivoted relative to each other. For testing the design of the seat a seat position is regularly predetermined with a specific backrest angle between the seat area and the backrest. It is only in cases where this backrest angle and its tolerance range, respectively, are observed that the measuring result has any significance. Owing to the articulated connection between the two parts, the two parts can be pivoted towards or away from each other such that they enclose an angle, at which each part is in contact with the seat area or backrest, respectively, with a contact area that is as large as possible, so that a relaxed reclining by the passenger is simulated.

When viewed from the side, the upper part of the body simulating element is pivoted around a hip point that is to simulate the human hip joint. Preferably, the part of the body simulating element coming into contact with the backrest is force-loaded. This simulates a passenger's reclining behavior. The articulated connection of the upper part of the body simulating element to the lower part is preferably configured such that a pivotal movement is possible in the direction of the backrest and is force-supported, but that it is also resilient within the range of tolerances of the backrest setting. The articulated connection may consist of a combination of an L-shaped lever for pivoting with a pneumatic cylinder for force application and resilience.

Since with such a construction the head does not come to rest on the seat, but it is only the distance between head and headrest that is to be measured, the head can be reduced in size to a reference measuring point in the body simulating element. The reference measuring point is preferably arranged on the body simulating element such that its position will also change when upon adjustment of the backrest of the seat the back plate changes its position. Hence, with one and the same body simulating element it is also possible to check a seat with adjustable backrest with respect to its design. The body simulating element is preferably of a compact construction in comparison with a dummy so that it can be easily "handled" by a robot arm. In the body simulating element, the imitation of the trunk is preferably omitted. Only the back areas cooperating with the seat are provided. Likewise, the lower leg extremities are normally not formed.

The reference measuring point forms the first measuring point of the distance to be measured and a reference area can be determined by a system, such as triangulation measurement, by using a reference area.

The second measuring point in the distance measurement is a point on the headrest that is preferably positioned at the same height as the reference measuring point. With the electronic comparison of the measured distance with a reference value a tested seat is approved or rejected under predefined criteria. The results of the distance measurement can be easily stored and processed for later testing or for quality management.

In a development of the method, forces and torques applied by the body simulating element against the robot kinematics are measured to control the positioning of the body simulating element in response to said introduced forces and torques.

The robot kinematics carries and guides the body simulating element. Upon placement on the seat the movement is carried out against the resistance put up by the seat cushion, whereby forces and torques are generated that are measured. With the stepwise lowering and lifting or also pivoting of the body simulating element around one or several axes, the position can be determined where the introduced forces and torques are minimal, said position corresponding to the position in which the body simulating element is neither moved by the robot into the seat cushion nor lifted from the cushion, i.e. only the predetermined weight is acting on the seat area and the backrest.

In a development of the method according to the invention, the positioning step also encompasses a center finding control, namely on an axle extending in a transverse direction of the seat. To this end the body simulating element is moved by means of the robot kinematics along the transverse axis and the sensed forces and torques are evaluated such that a rise in force and/or torque stands for the attainment of a lateral end position, for the forces and torques will rise at any rate whenever the body simulating element touches lateral beads projecting beyond a seat area as such and is pressed against said bulges. The robot is controlled by a computer along a path, and whenever a lateral end position is reached, the associated coordinates of the path curve are memorized for subsequently calculating the point positioned in the center thereinbetween and for moving to said point.

A development of the center finding control comprises the steps of: placing the body simulating element on the seat area by the robot until the measured forces and torques tend towards zero; robot-supported shifting of the body simulating element in the direction of the backrest until a predetermined abutment force has been reached, the shifting relative to the transverse axis and the height being controlled without force; moving the body simulating element forwards away from the backrest and vertically upwards, so that the body stimulating element is lifted from the seat area; shifting the body simulating element against a first lateral abutment of a seat bead of the seat area and memorizing said first lateral end position; shifting the body simulating element against a second lateral abutment of the seat bead and memorizing said second lateral end position; moving the robot into the center between the two lateral end positions; placing the body stimulating body by the robot until there are no longer any forces or torques acting on the sensor; shifting the body simulating body by the robot in the direction of the backrest with a second predetermined abutment force; and reaching a reference position by renewed passive switching of the robot kinematics until forces and torques are no longer acting. It is not only simulated in this method that the passenger is centrally oriented in the seat, but also that said person drops into the seat and the weight of the body, multiplied by the acceleration (or dropping movement), yields a force acting on the cushion of the seat area and the backrest and leading to a deformation that in the rest position of the passenger is not fully compensated by the restoring force of the cushion.

A development of the method according to the invention provides for the step of swinging around the transverse axis extending in the seat width by adjusting the inclination around an angular range extending from a positive angle to a negative angle so as to sense an inclination position with minimum torque. The inclination is here preferably within an angular range of +5° to −5°.

According to a preferred embodiment the method provides for the step of measuring the inclination of the body simulating element in the region simulating the back so as to verify an angle of inclination predetermined for the conduction of the test between the backrest and the vertical, so that the angle of the backrest can be readjusted and the preconditions required for quality control can be created. In the sense of quality assurance the angle of inclination found in the distance measurement can be stored by a computer together with other data regarding this seat, such as serial number of the seat, measured distance or calculated center. To automate the testing operation to a substantial degree, the readjusting operation can be carried out by an additional robot.

According to a preferred development the robot for testing a specific model is programmed haptically on said model in that the robot with the body simulating element is guided by hand and the robot movements required thereby are stored in a corresponding program. In this haptic program, handling forces and torques acting on the body simulation element are sensed. The data of the sensed forces is transformed into control commands for the robot to follow the handling forces and torques effected by the hand of the user. The control commands are stored to define a testing path for testing operation (compare EP 1 922 596 B1 the contents thereof being incorporated by reference). Thus testing operations can be programmed for the different seat models in a rapid and efficient way.

The method according to the invention is particularly suited for use as a product control in the series production of the seats and can be carried out on the conveyor belt on which the seats to be assembled are transported. Since the method operates rapidly, it can be used for a 100% control.

The object is also achieved according to the invention by a device with a body simulating element having a predetermined weight and a reference measuring point, a means assigned to the headrest for measuring a distance between the reference measuring point and the headrest, and a robot for positioning the body simulating element on the seat. The robot is preferably an articulated arm robot that with a relatively small available space exhibits a relatively large operating range. Positioning by means of the robot is carried out quickly on a preprogrammed path. The distance to be measured lies between the reference measuring point on the body simulating element and a point on the headrest, preferably a point of approximately the same height as the reference measuring point. The device can also be configured such that the shortest distance between the reference measuring point and the measuring point on the headrest is determined.

The means for measuring a distance may be a distance sensor, the optics of the distance sensor possibly corresponding to the reference measuring point. The means for measuring the distance is preferably a triangulation sensor that yields measurement results with small tolerances also over the relatively small distance (<10 cm) to be measured.

In a development, the device comprises a sensor for providing measured values of forces (Fx, Fy, Fz) along axes of a three-dimensional Cartesian coordinate system and of torques (Mx, My, Mz) around the axes of the three-dimensional Cartesian coordinate system. These measured values are used by the computer for controlling the path of the robot in response to force and torque. Preferably, the sensor is arranged between the robot kinematics and the body simulating element so as to receive the introduced forces and torques directly. The sensor may be a force/torque sensor with three axes, the measurement values of which are fed back to the computer guiding the robot arm, which computer can then optimize the path for the robot arm in real time.

The device preferably comprises an inclination sensor for verifying the predetermined angle of inclination of the backrest relative to the vertical. The distance measurement will only produce a significant result if it is carried out at a specific angle of the backrest. For this purpose, the seat to be tested is set to a specific backrest angle before being loaded, the angle being for example controllable by an imaging method. Under the load applied by the body simulating element the backrest angle may have changed to such an extent that it is outside the tolerances. A wrong positive result might be ascribed to a seat tested under these circumstances, i.e. it might be approved and supplied to the customer although if it had been measured in conformity with the guidelines it would have been rejected. This mistake can be ruled out if the distance measurement is only carried out if the inclination sensor, which is assigned to the back plate acting on the backrest, confirms that the angle of inclination of the backrest is within the predetermined range also under load.

According to a preferred embodiment the device comprises a conveyor belt on which the seat is mounted during testing, and on which it was preferably assembled. In this case neither a transfer nor a temporary storing of the seat is needed. Quality control can be carried out in an end-of-line inspection during manufacture and its result may either be approval or rejection.

Preferably, the means assigned to the headrest for measuring a distance is mounted on the body simulating element, so that it represents the reference measuring point itself.

According to an embodiment the device comprises an additional robot for seat adjustment, so that the method according to the invention can rapidly carry out the configuration of the seat for different seat positions.

The device according to the invention is normally provided with a central controller including a powerful computer that senses and stores the test paths and setpoint values to be executed at predetermined reference positions. Different specifications may be provided for different seats. The controller normally communicates with the outputs of the sensor to permit, for instance, a haptic programming as well. This haptic programming is e.g. described in EP 1 922 596 A1 and makes it possible to guide the robot movement manually in a programming mode in which the signals of the sensor sensing a manual operating force that is acting on the sensor side facing away from the robot are processed for controlling the robot movement. Subsequently, the robot arm "follows" the manual operating force of a user.

BRIEF DESCRIPTION OF THE DRAWINGS

The present invention will now be explained with reference to an embodiment taken in conjunction with the drawing, in which.

DETAILED DESCRIPTION OF THE PREFERRED EMBODIMENTS

Figure 1:
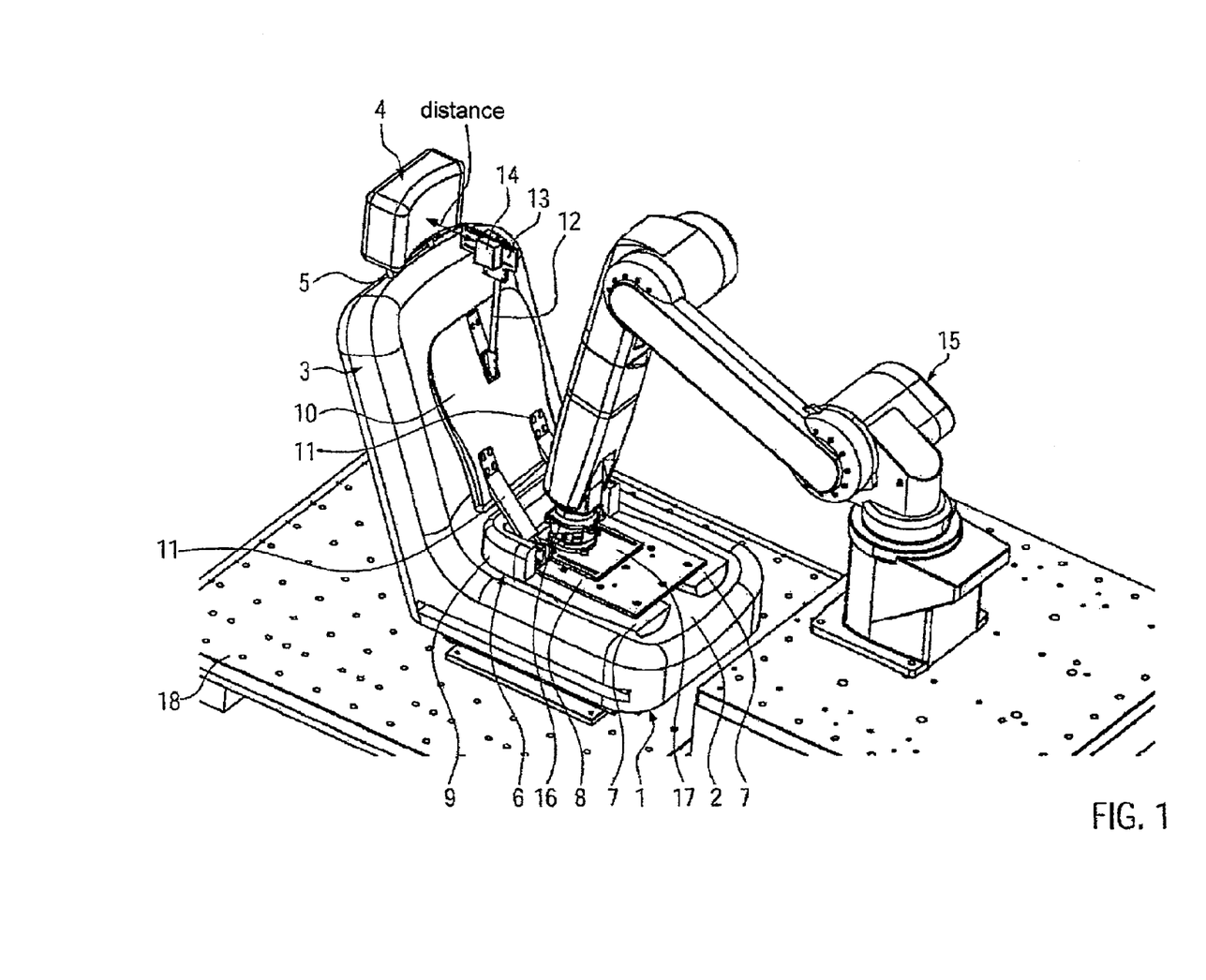
FIG. 1 is a perspective top view on the embodiment.

FIG. 1 is perspective top view on a device according to the invention for testing the design or configuration of a seat 1 comprising a seat area 2, a backrest 3 and a headrest 4, which is connected via bars 5 to the backrest 3. A body simulating element comprises a test shell 6 which is placed on the seat area 2 and comprises two semitubular sections 7, which are to represent a passenger's thighs. The bulges of the semitubular sections 7 are pressed by the weight of the test shell 6 to some extent into the seat area 2. A plate 8 is positioned on the flattened side of the sections 7 to tare a predetermined weight. At least in the rear area the test shell comprises an edge 9 for accommodating a shaft or axle extending transverse to the seat. The body simulating element further comprises a back plate 10 which is connected to the test shell 6 via two pivot levers 11 supported on the axle and gets into contact with the backrest 3 during the testing operation. An extension arm 12 is arranged on the back plate 10. The free end of said arm has arranged thereon a mounting device 13 for a device 14 used for measuring a distance. Said device may be a distance sensor. The distance sensor 14 is oriented with its optics towards the headrest 4 and is arranged such that it measures the distance from the headrest 4, for example with the help of an optical measuring method, such as triangulation. In this case the distance sensor 14 itself represents the reference measuring point, wherein a center (H-point), which will be described in more detail in conjunction with FIG. 3), of an axle 19 forms a position reference point for the distance vector. For controlling the sensor and for transmitting the measurement results the distance sensor 14 is connected to a computer.

The test shell 6 can be subjected to tests in an automated way. The seat to be tested is normally located on a conveyor belt, which may be part of the movement path of the seat in the manufacturing process. As an alternative, a second robot may be provided that places the seat to be tested on the test bench. As a rule, a second robot is provided at any rate for adjusting the seat position. Specifically with the second robot a position of the backrest is adjusted at an inclination angle of 25°±2°, based on the contact surface formed by the backrest, which angle is enclosed between the contact surface and the vertical plane. The backrest is slightly inclined backwardly as in usual operation of the backrest. The setting of this angular position of the backrest of the seat is normally carried out by the second robot.

At the end of its operating arm a robot 15 comprises a force/torque sensor 16 which is connected to a support 17 on the test shell. The seat 1 is provided on a conveyor belt or on a platform 18. The test shell together with the back plate and the distance sensor is meant to simulate a passenger and has therefore preferably a predetermined weight and more or less imitates thighs on the underside. The shaping body of the test shell may also be made of plastics, which is relatively lightweight. The original weight can here be created by an integrated plate made of a material having a relatively great weight, for instance iron.

Figure 2:
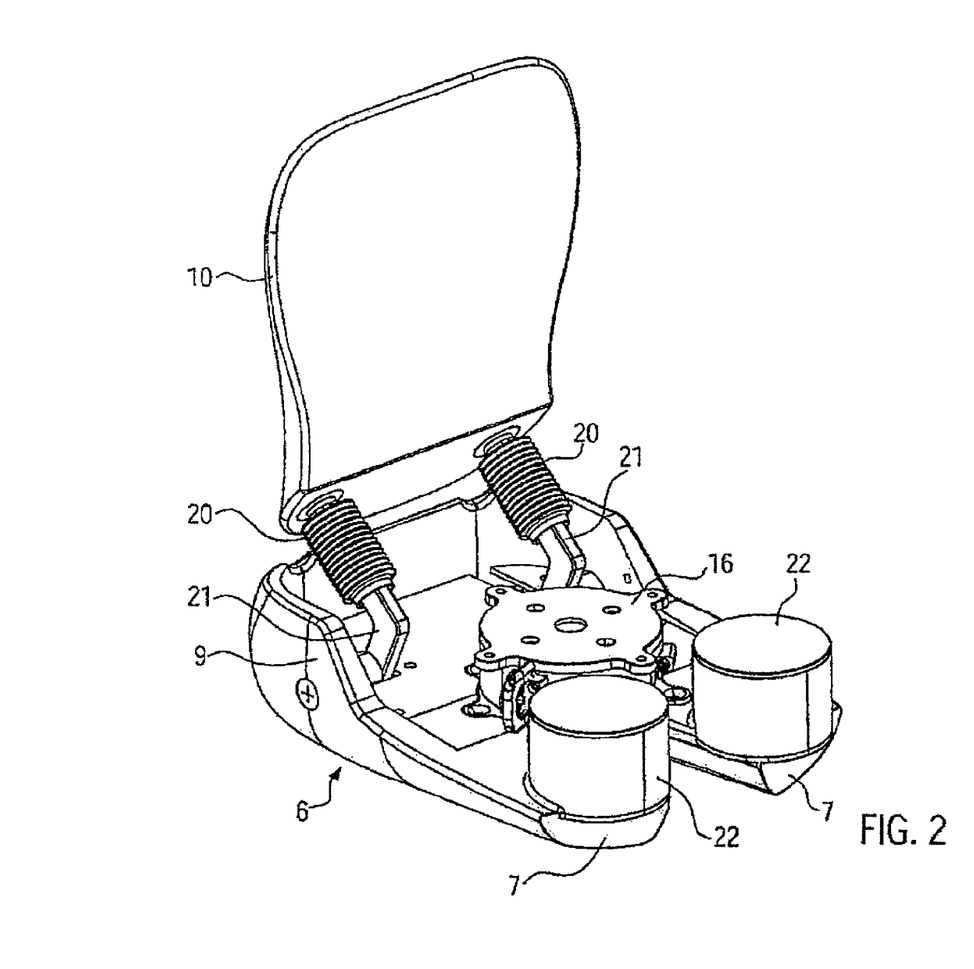
FIG. 2 is a perspective top view on an embodiment.

FIG. 2 is a perspective top view on an embodiment of the physical simulation element comprising a test shell 6 and a back plate 10 which is articulated to and adjustably arranged on the test shell 6. On the semitubular sections 7 simulating the thigh stumps, the test shell 6 comprises respective can-shaped receiving means for simulation weights 22, the boundaries of the test shell 6 with the seat having a surface contour imitating a human body. These simulation weights 22 are configured as disks, with the height of the placed disks being variable for changing the simulated weight. A pot for receiving a three-axis sensor 14 rises centrally in the test shell, with the robot arm being adapted to be fixedly screwed to the upper cover of said pot.

The back plate is designed as a torso shell, i.e. it has a spatial extension corresponding to a human torso. The upper boundary corresponds to the shoulder line. The back plate 10 is articulated to the test shell 6. Translational actuators 20 in the form of pneumatic cylinders which are supported on an L-shaped pivot lever 21 relative to the test shell 6 are positioned between the test shell 6 and the back plate 10. The two pivot levers 21 are hingedly mounted on the test shell 6. The pivot axis of the L-shaped pivot levers 21 corresponds to the hip axis, i.e. the rotational axis of the hip joint extending in a direction transverse to the longitudinal axis of the body. This is marked in FIG. 3 with reference numeral 19.

FIG. 1 shows the unfolded position of the back plate 10 which is preset such that the back plate 10 assumes a predetermined position. This position can be predetermined by stops, or the like. At any rate an inclinometer that determines the real angle of inclination of the back plate 10 is disposed inside the back plate 10. The back plate 10 is preset at an inclination angle of 25° relative to the vertical (based on the contact the contact surface formed by the back plate 10).

FIG. 2 does not show the extension arm provided for distance measurement; this arm, however, can also be provided and designed in the way shown in FIG. 1. The back plate has further provided therein a triangulation sensor used for distance measurement. The triangulation sensor calculates the distance of the reference point from the surface of the headrest on the basis of the measured angle of inclination and with the known lever arms relative to the reference point.

Figure 3:
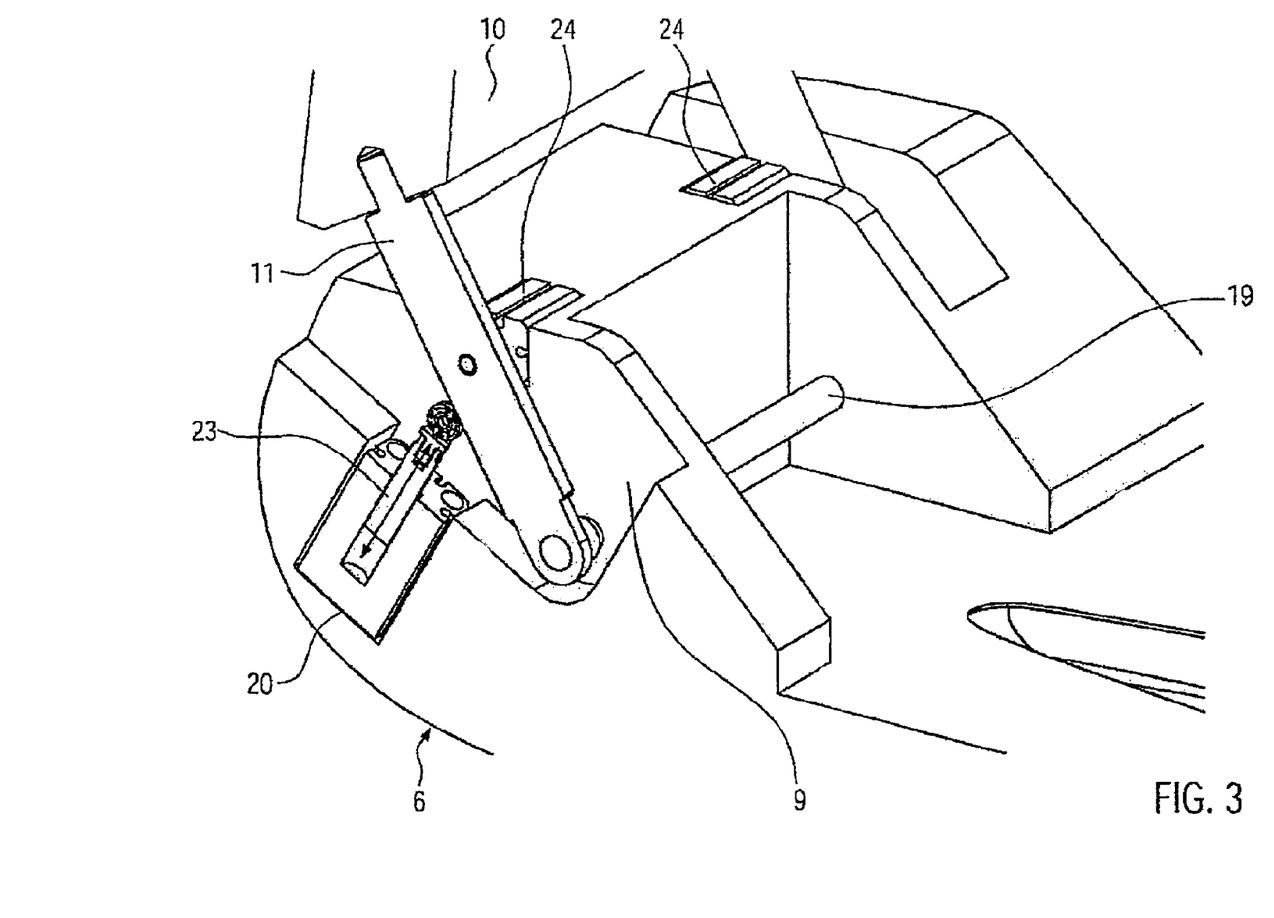
FIG. 3 is a perspective side view of a detail of the embodiment of a body simulating element.

FIG. 3 shows a mechanism for moving the back plate 10 which is pivotably arranged around an axle 19. To this end two pivot levers 11 connect the back plate 10 to the axle 19 which in the transverse direction (X-direction) of the seat is supported on the test shell on the edge 9. The center of the axle 19 forms an H-point in the measurement arrangement and is to simulate a passenger's hip. At least one translational actuator 20 is arranged on the test shell 6. The actuator 20 comprises, for instance, a plunger 23 which directly or indirectly acts in a pivoting way on at least one of the pivot levers 11. The operating element is here moving forwards and upwards. The test shell comprises at least one lock 24 that can be shifted in parallel with the pivot axis 19. In the retracted state the lock 24 releases the pivot range of the pivot levers 11. In the extended state (not shown) the lock 24 blocks the pivot lever 11.

Figure 4:
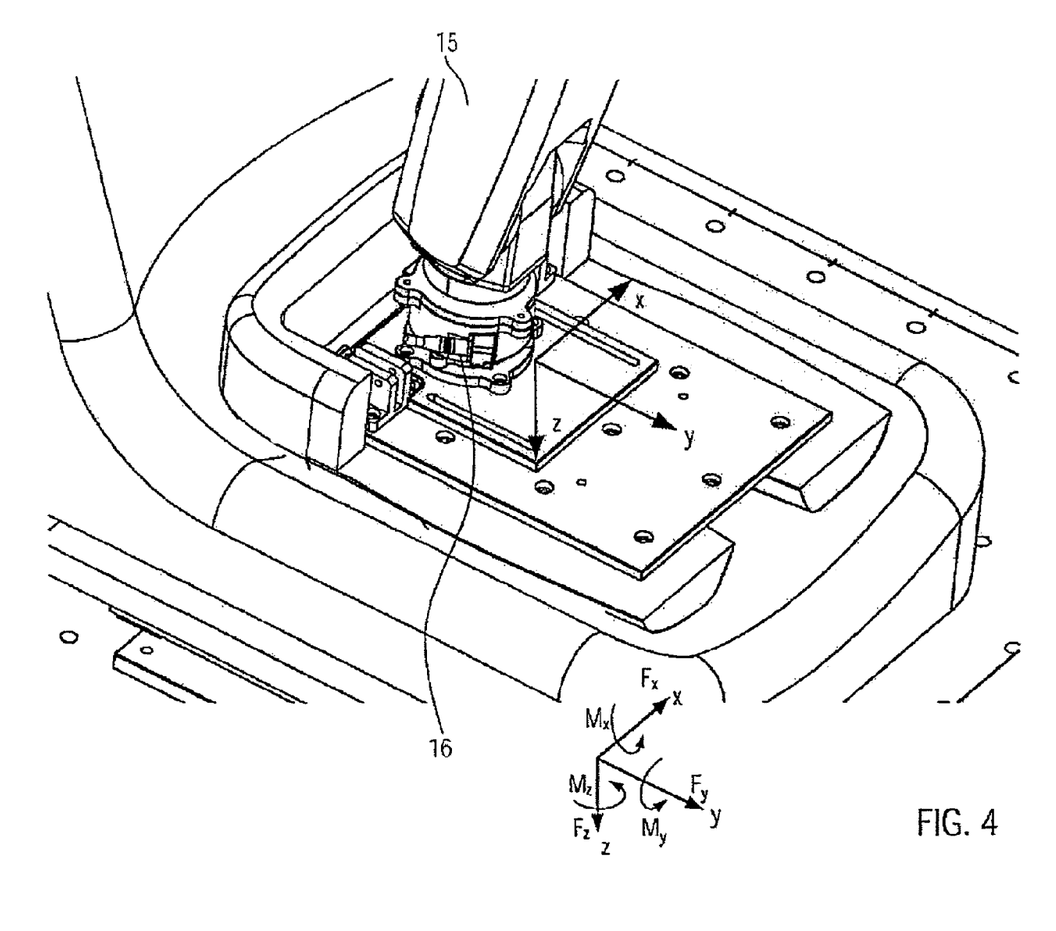
FIG. 4 shows a force/torque sensor as a detail.

As a detail of the arrangement, FIG. 4 shows the force/torque sensor 16, which supplies as measured values the forces Fx, Fy, Fz along the three axes (X, Y, Z) and the torques Mx, My, Mz around the three axes (X, Y, Z). With the help of the force/torque sensor the robot 15 carries out force/torque-controlled movements for reference finding.

Figure 5:
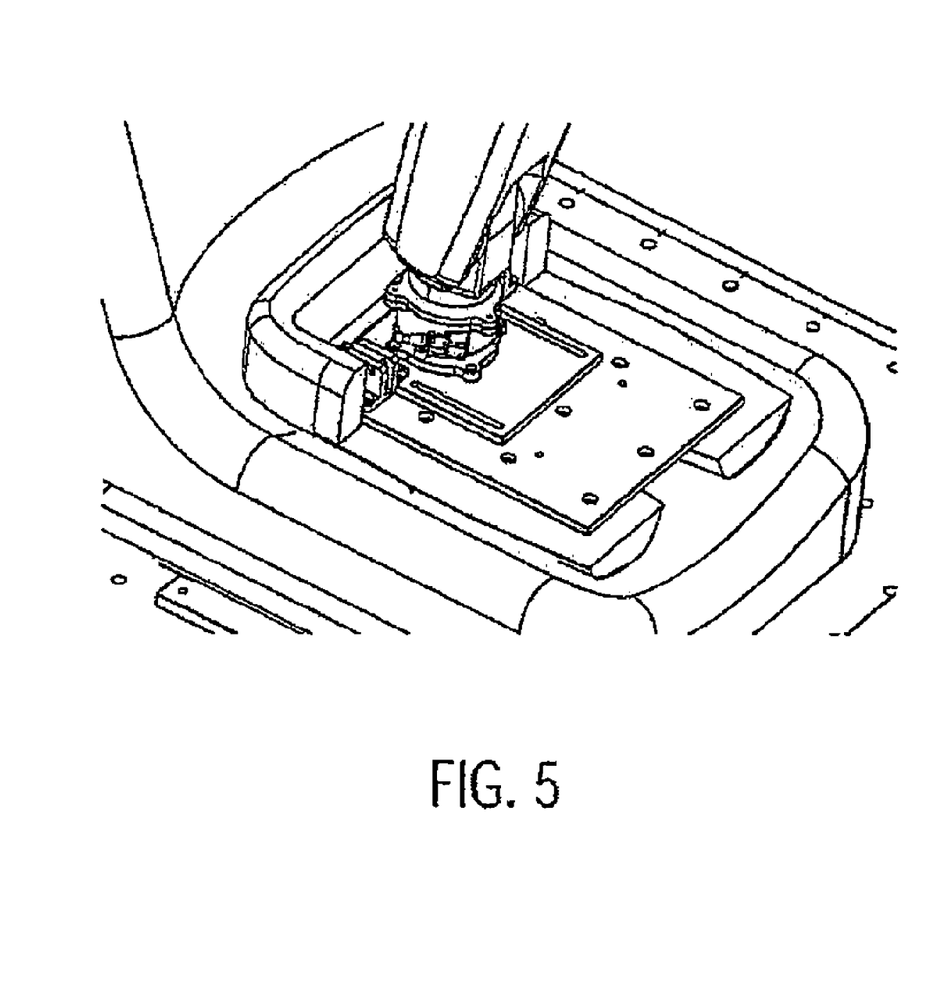
FIG. 5 shows a first reference-finding step.

FIG. 5 shows the first reference-finding step in which the robot 15 with the test shell 6 connected via the force/torque sensor 16 and the support 17 moves into an initial position located slightly above the seat 1. The test shell 6 is here suspended with its weight from the robot arm and the sensor 16, respectively.

FIGS. 6A to 14B show different phases for installing the body simulating element in consideration of the measured forces and torques. The position of the robot arm with the body simulating element relative to the seat is each time shown at the left side. The force/torque curve in the respective phase is illustrated in the right diagram. The movements of the body simulating element relative to the seat become also apparent from the Cartesian coordinate system, which is also shown in the figures.

Figure 6A:
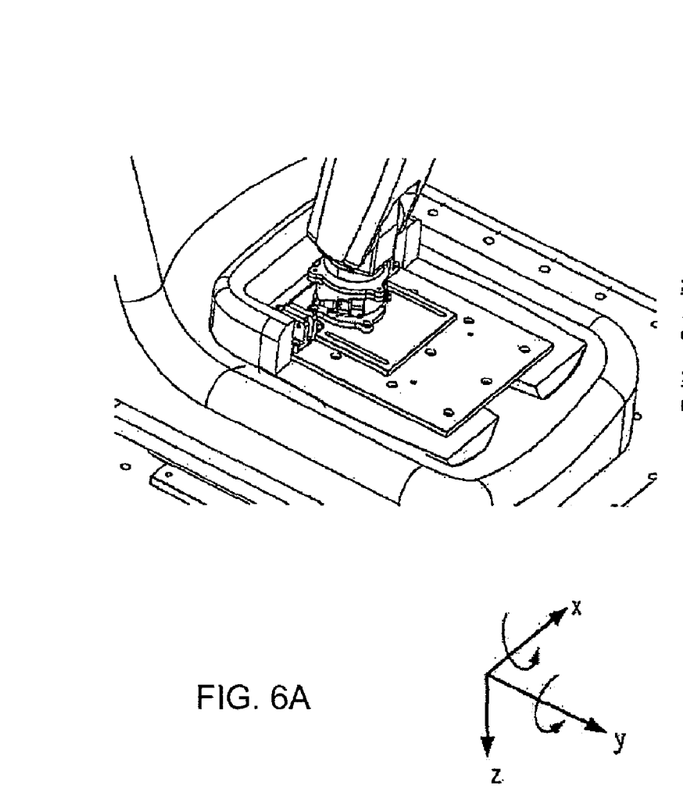
FIGS. 6A and 6B show the controlled placement of a shell on the seat.
Figure 6B:
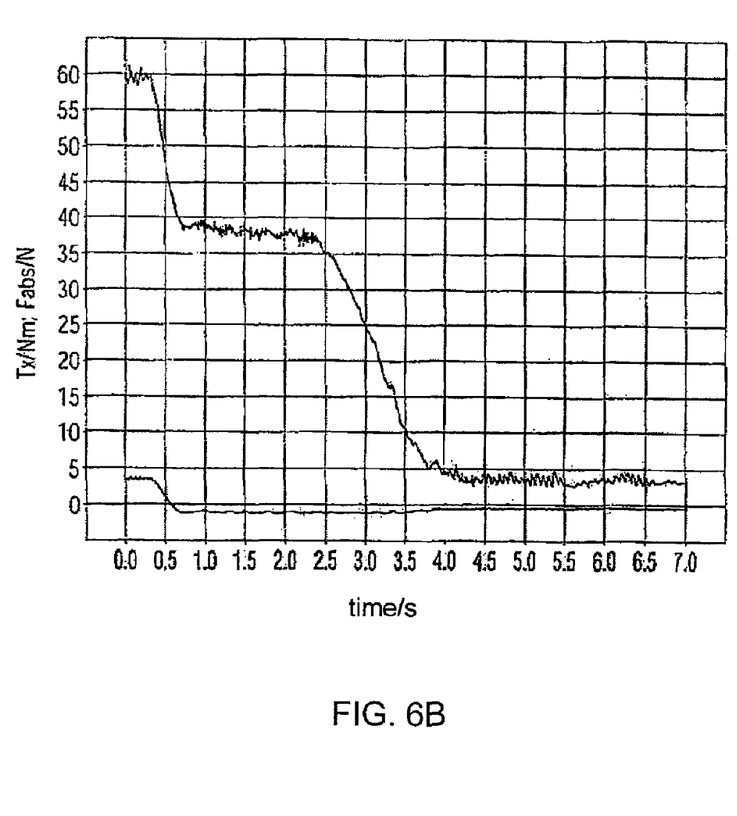

FIGS. 6A and 6B show step 2 of the method according to the invention. The robot 15 places the shell 6 in a controlled manner on seat 1 until the measured forces and torques tend to assume zero, as becomes apparent from the time-torque/force diagram.

Figure 7A:
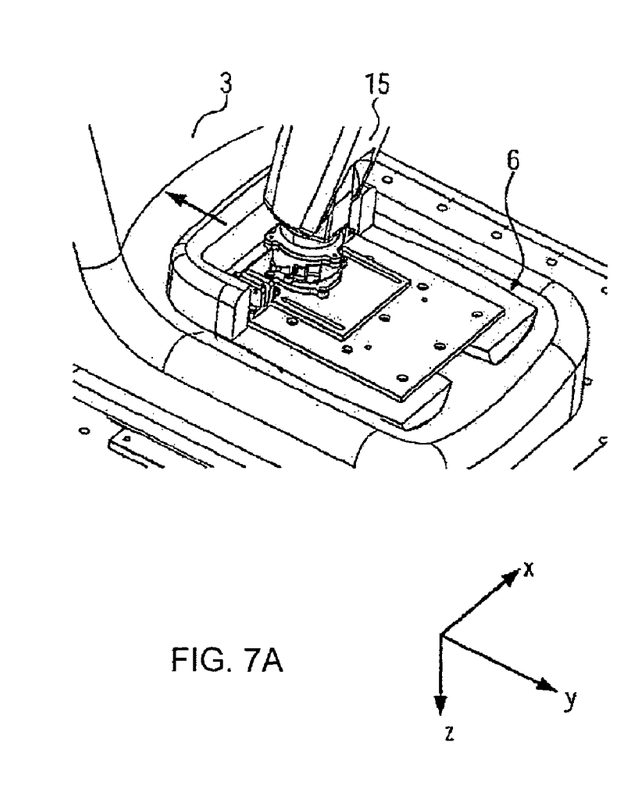
FIGS. 7A and 7B show the shifting of the shell towards a backrest.
Figure 7B:
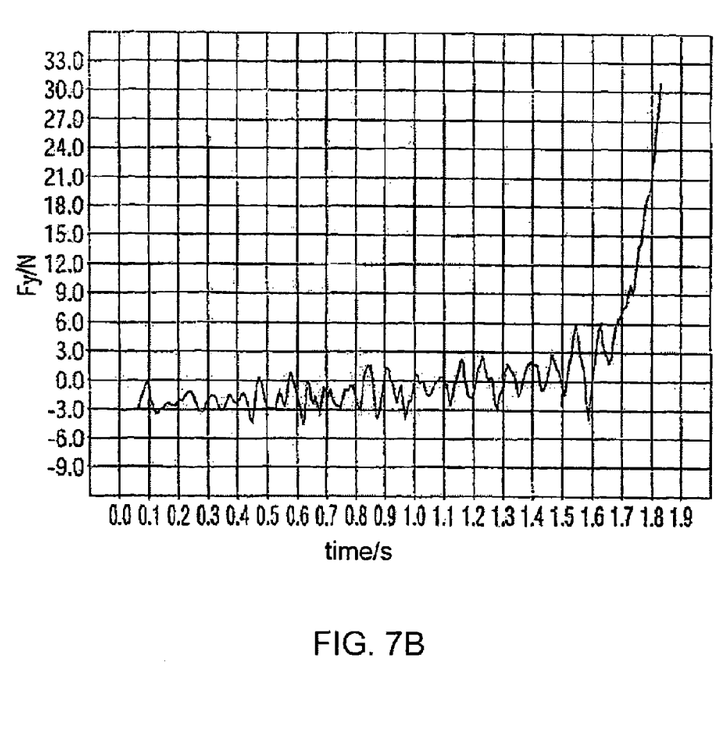

FIGS. 7A and 7B show step 3 of the method according to the invention. The robot 15 shifts the shell 6 towards the backrest 3 (negative Y-direction), the X- and Z-direction being adjusted without force until a defined abutment force in the negative Y-direction is reached, which in the time/force diagram is illustrated as a curve Fy that is strongly rising towards the end.

Figure 8:
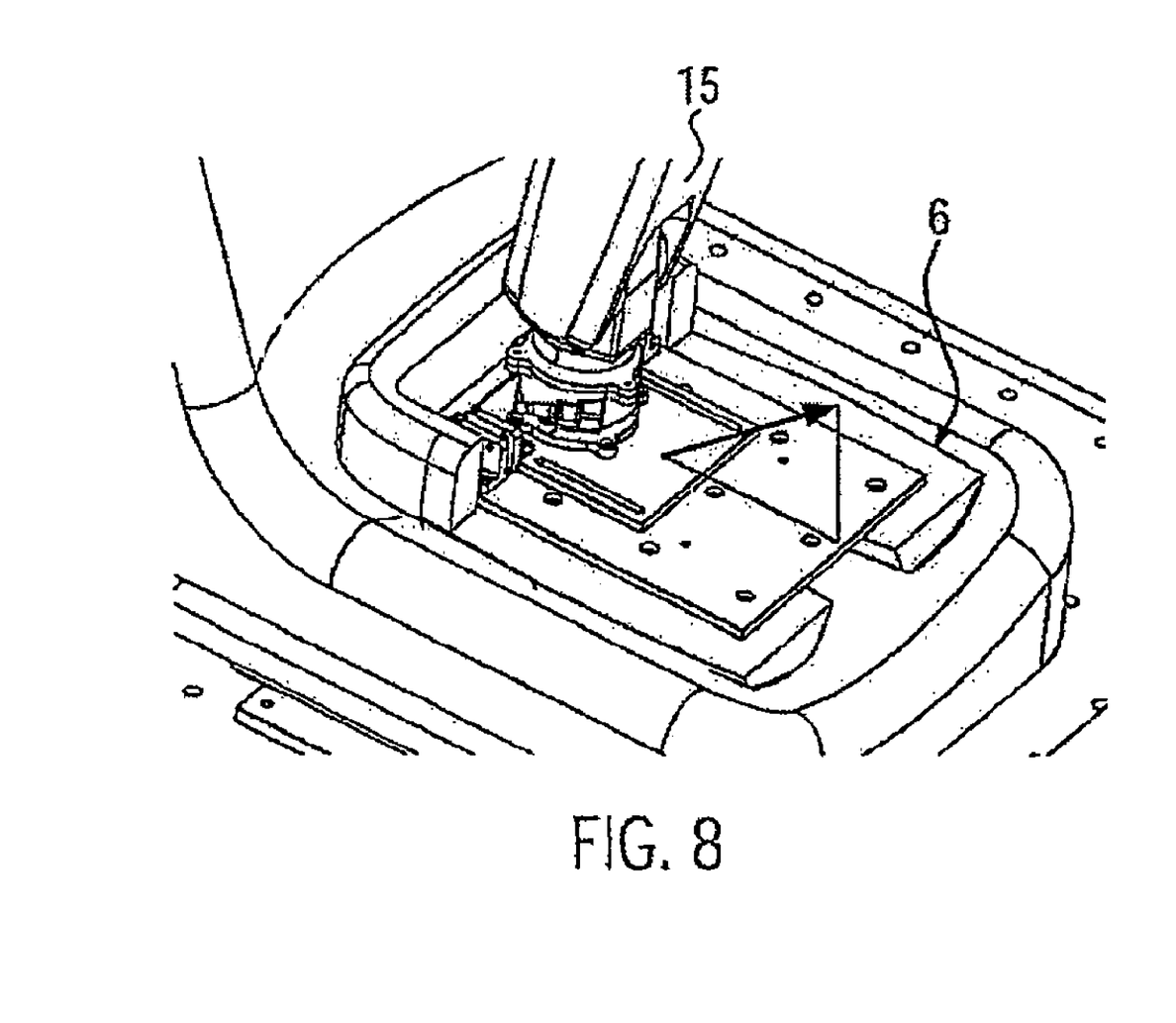
FIG. 8 shows the shell hovering.

FIG. 8 shows step 4 of the method according to the invention. The robot 15 moves slightly back (positive Y-direction) and upwards (negative Z-direction), so that the shell 6 is hovering.

Figure 9A:
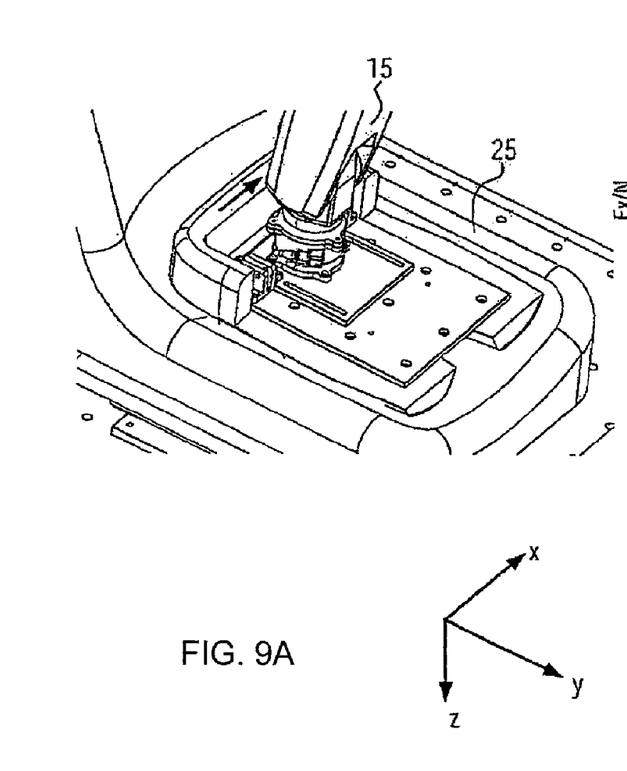
FIGS. 9A and 9B show the determination of a right end position of the shell.
Figure 9B:
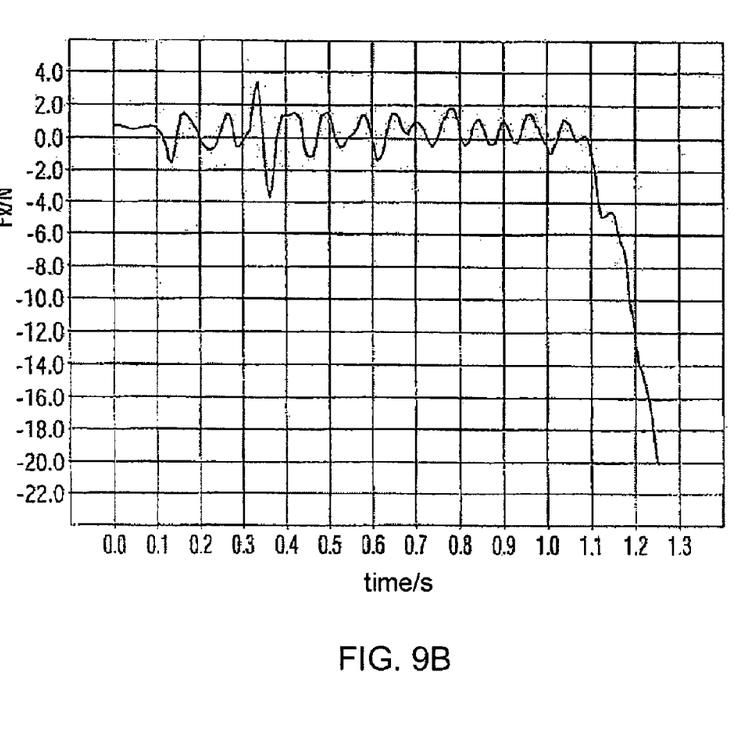

FIGS. 9A and 9B show step 5 of the method according to the invention. The robot 15 shifts the shell 6 against a right (positive X-direction) abutment of a seat bead 25, with a predefined abutment force in positive X-direction. The coordinates describing this end position are memorized by the computer-aided control of the robot as the right end position Pr.

Figure 10A:
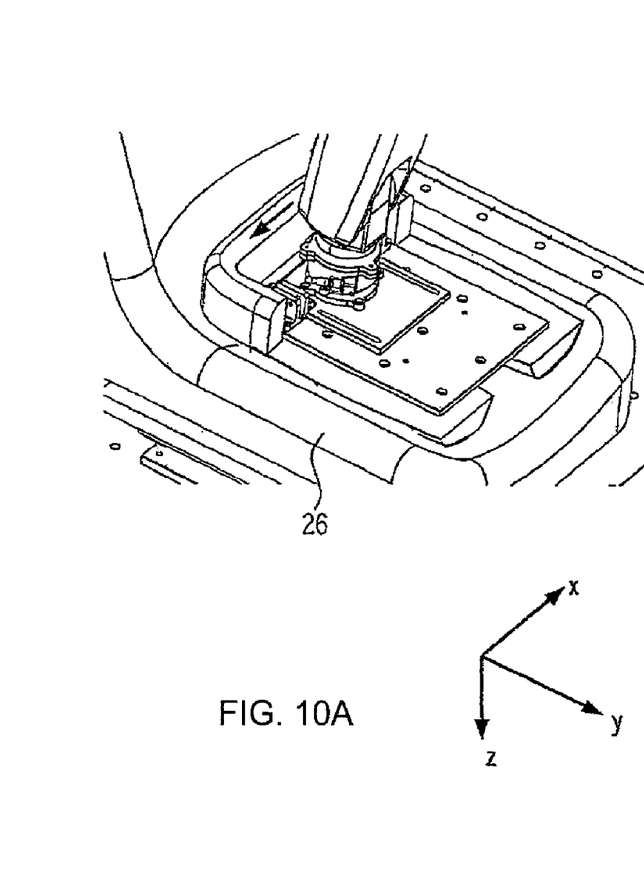
FIGS. 10A and 10B show the determination of a left end position of the shell.
Figure 10B:
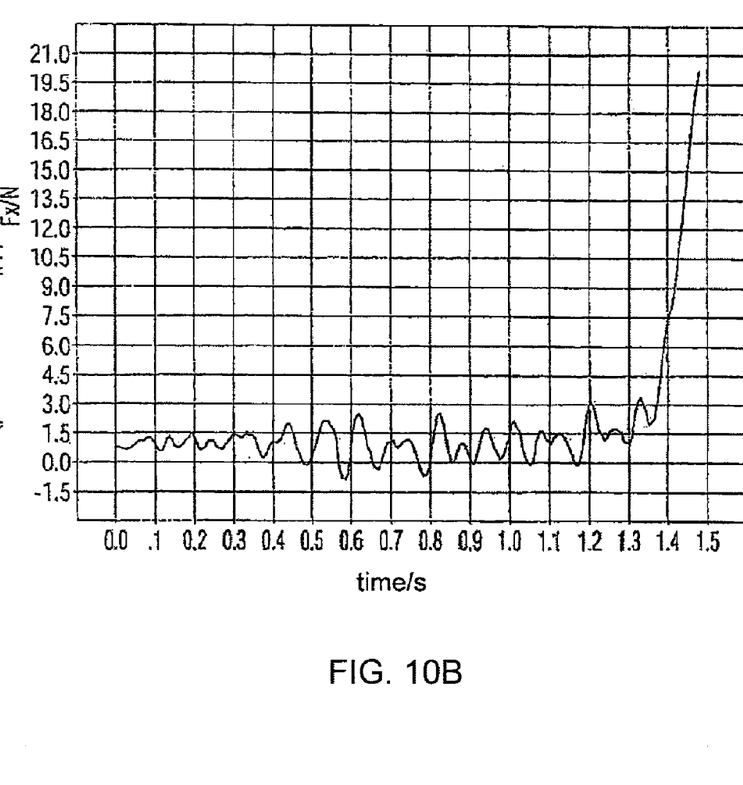

FIGS. 10A and 10B show step 6 of the method according to the invention. The robot 15 shifts the shell 6 against a left (negative X-direction) abutment of a seat bead 26, with a predefined abutment force. The coordinates are memorized by the computer-aided control of the robot as the left end position Pl.

The force curves calculated in steps 5 and 6 are converted for center finding.

Figure 11A:
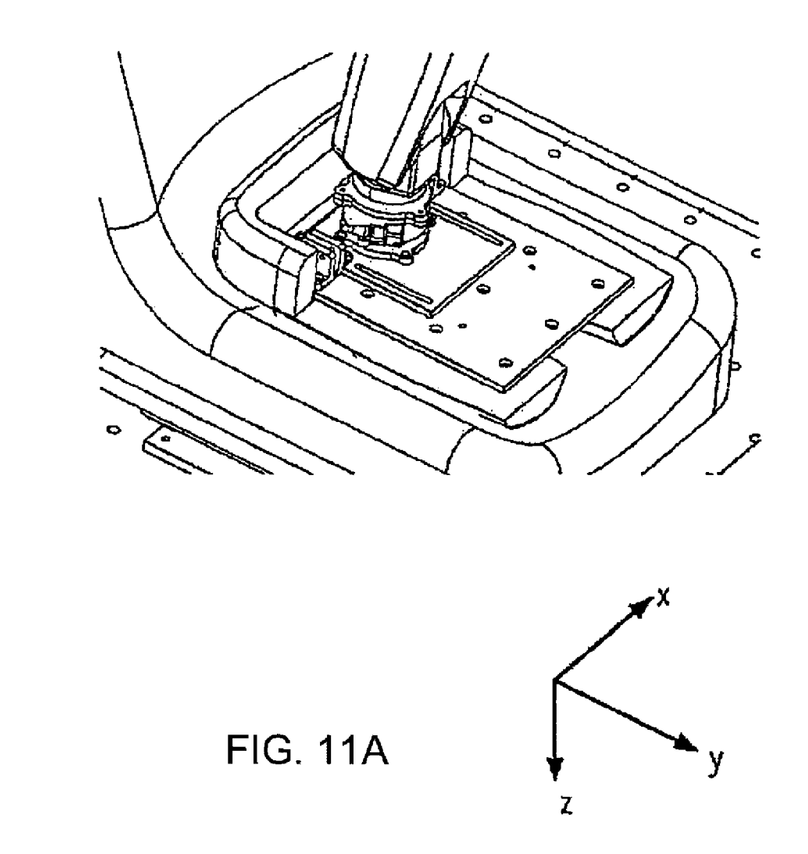
FIGS. 11A and 11B show the center finding process.
Figure 11B:
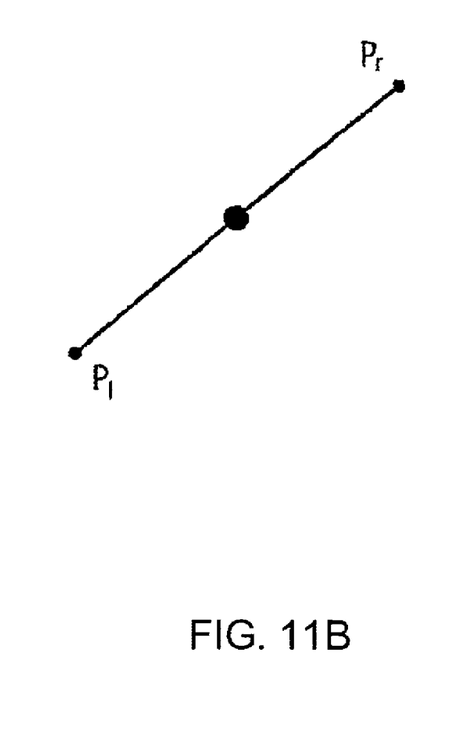

FIGS. 11A and 11B show step 7 of the method according to the invention. The computer calculates the arithmetic center on the basis of the left and right end position memorized in the two preceding steps. The robot 15 moves into this computed center.

Figure 12A:
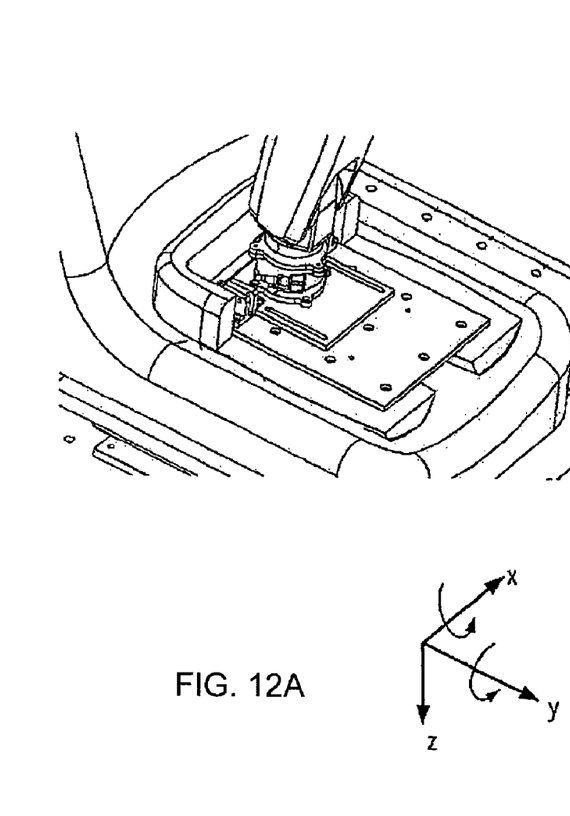
FIGS. 12A and 12B show a controlled placement of the shell.
Figure 12B:
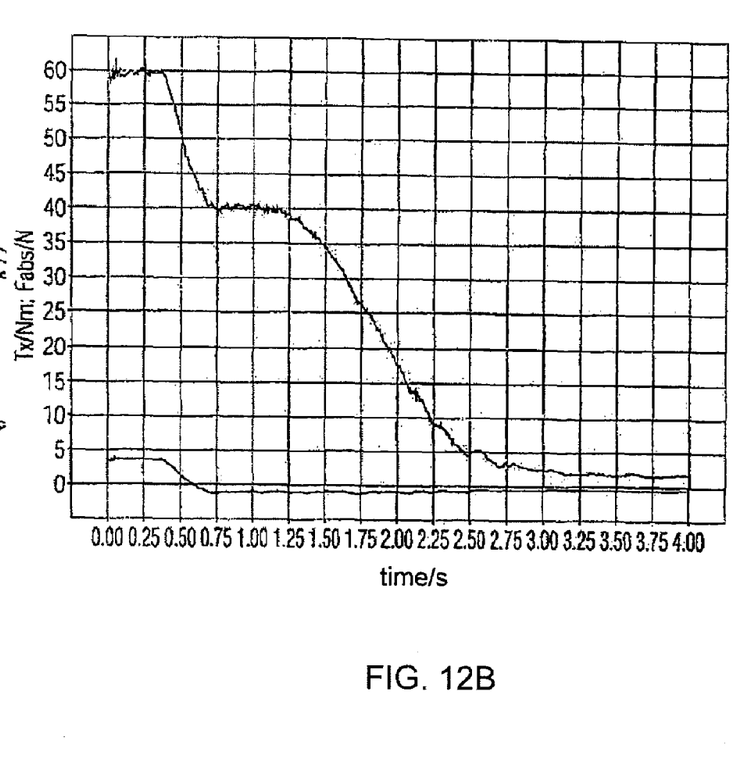

FIGS. 12A and 12B show step 8 of the method according to the invention. The robot 15 puts the shell 6 down again in a controlled way until the measured forces and torques tend to assume zero, as becomes apparent from the time-torque/force diagram (as in step 2).

Figure 13A:
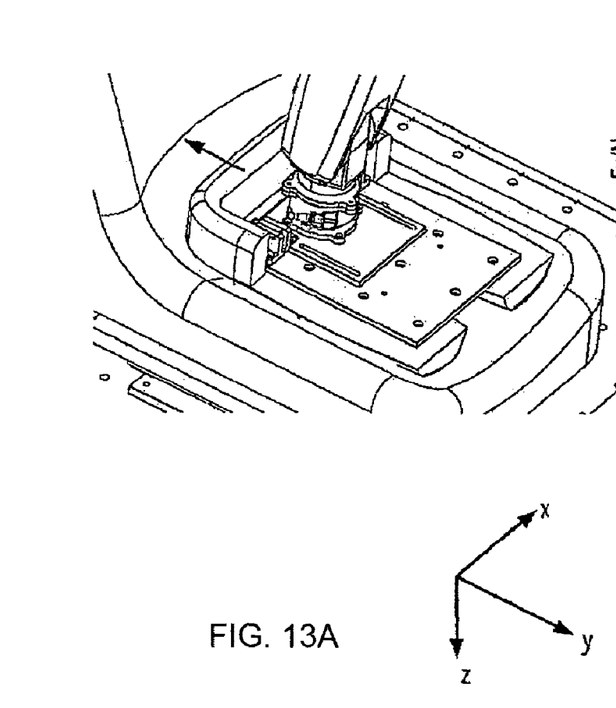
FIGS. 13A and 13B show the shifting of the shell into the backrest with a predefined abutment force.
Figure 13B:
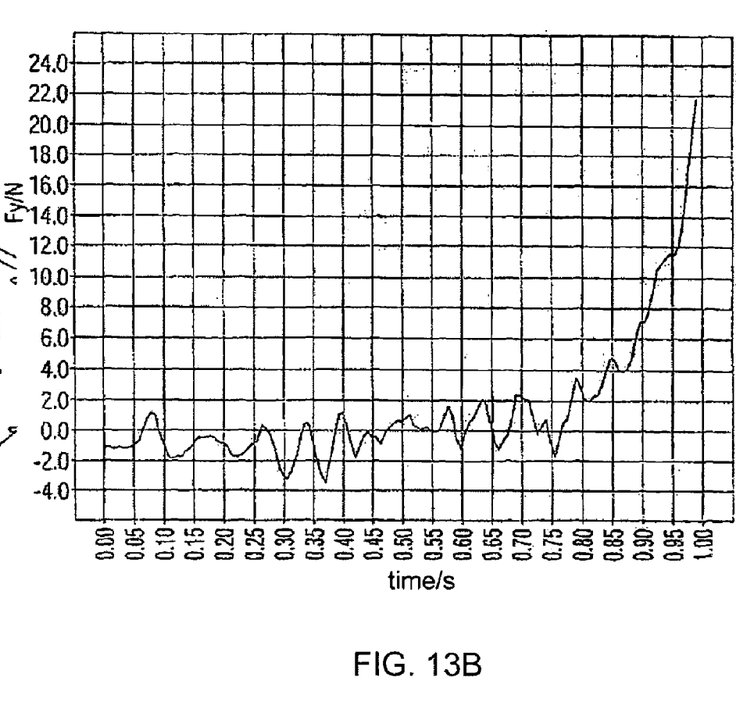

FIGS. 13A and 13B show step 9 of the method according to the invention The robot shifts the shell 6 again rearwards (negative Y-direction), the X- and Z-direction being controlled without force (as in step 3) until a predefined abutment force is reached in the negative Y-direction, represented by the rising curve progression in the time/force diagram.

Figure 14A:
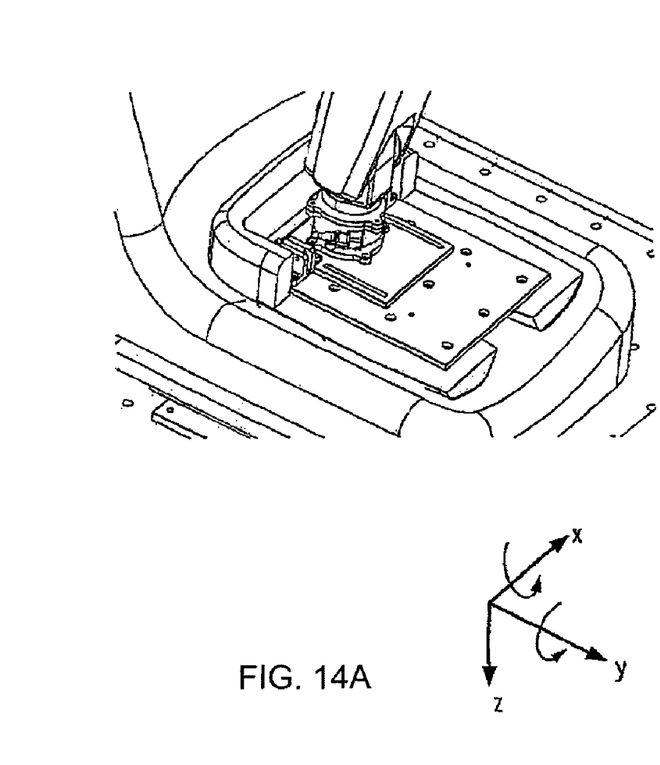
FIGS. 14A and 14B show the desired reference position of the body simulating element.
Figure 14B:
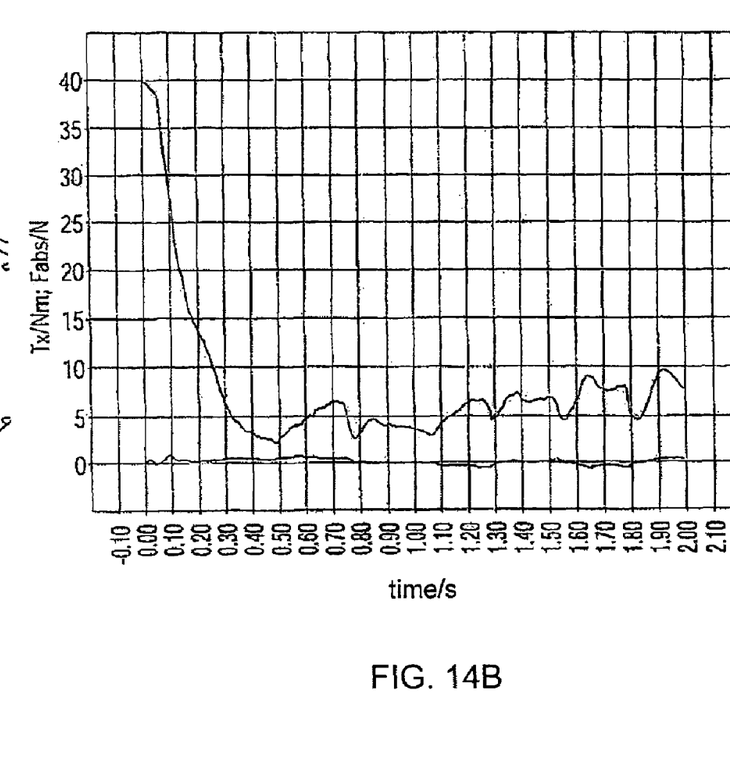

FIGS. 14A and 14B show step 10 of the method according to the invention. The robot 15 relaxes the shell 6 again until there are no longer any forces or torques acting (as in step 2). The shell 6 is located in the desired end position. This end position determined by the robot in consideration of the really acting forces corresponds to the position that is supposed to be occupied by the seat user in a casual way. In the above-described method a measurement position is thereby set that is based on the real conditions of the manufactured seat. With the help of the robot and the force/torque measurements, the body simulating element "probes" the seat position that can be expected to be also occupied by the user. Distance measurement is carried out in the end position set in this way.

Thereupon distance measurement is carried out in consideration of the real conditions. In contrast to the known prior art, in which a dummy was positioned on the seat by hand, the above-described measuring method rules out artifacts that might be introduced by the introduction of the measuring point (dummy's head). Position finding is solely based on the interaction between the cushion material of the seat to be measured and the body simulating element; and on the basis of the force and torque measurement the robot sets a measuring position that could be individual for each seat, but is reproducible due to the seat behavior.

The invention claimed is:

1. A method for testing the design of a seat comprising a seat area, a backrest, and a headrest, the method comprising the steps of:
    positioning a body simulating element with a reference measuring point on the seat area, using a robot that is a preprogrammed with active kinematics, so that the body simulating element leans against the backrest;
    switching the kinematics of the robot to passive;
    measuring a distance between the reference measuring point and the headrest; and
    electronically comparing the measured distance with a reference value.

2. The method according to claim 1, further comprising measuring, with a sensor, forces and torques applied by the body simulating element against the kinematics of the robot so as to control the positioning of the body simulating element in response to the introduced forces and torques.

3. The method according to claim 2, wherein the positioning step comprises controlling a center finding on an axle extending in a transverse direction of the seat, by moving the body simulating element along the transverse axis, and detecting lateral end positions of the axle by using the measured forces.

4. The method according to claim 3, wherein the step of controlling the center finding comprises the following steps:
    using the robot, placing the body simulating element on the seat area until the measured forces and torques tend towards zero;
    robot-supported shifting of the body simulating element in the direction of the backrest until a predetermined abutment force has been reached, wherein the shifting is regulated so as to be force-free with respect to the transverse axis and a height of the seat;
    moving the body simulating element forwards away from the backrest and vertically upwards, so that the body simulating element is lifted from the seat area;
    shifting the body simulating element against a first lateral abutment of a seat bulge of the seat area and electronically memorizing a first lateral end position (Pl);
    shifting the body simulating element against a second lateral abutment of the seat bulge and electronically memorizing a second lateral end position (Pr);
    moving the robot into the center between the two lateral end positions (Pl, Pr);
    placing the body simulating element, using the active kinematics of the robot, until there are no longer any forces or torques acting on the sensor;
    shifting the body simulating element, using the active kinematics of the robot, in the direction of the backrest with a second predetermined abutment force; and
    reaching a reference position by renewed switching the kinematics of the robot to passive until the measured forces and torques are no longer acting.

5. The method according to claim 3, further comprising rocking around the transverse axis extending in a seat width by adjusting the inclination around an angular range extending from a positive angle to a negative angle so as to sense an inclination position with minimum torque.

6. The method according to claim 1, further comprising the step of measuring the inclination of the body simulating element in a region simulating the back so as to verify an angle of inclination predetermined for conducting the test between the backrest and a vertical direction of the seat.

7. The method according to claim 6, further comprising readjusting the angle of inclination of the backrest.

8. The method according to claim 7, wherein an additional robot carries out the readjusting step.

9. The method according to claim 1, wherein the active kinematics of the robot are pre-programmed for testing a specific model of a seat in that the robot with the body simulating element is guided by hand and the active kinematics of the robot required thereby are stored in a corresponding program.

10. A device for testing the design of a seat comprising a seat area, a backrest, and a headrest, the device comprising:
    a body simulating element having a predetermined weight and a reference measuring point;
    a distance sensor, assigned to the headrest, for measuring a distance between the reference measuring point and the headrest, the distance sensor being mounted on the body simulating element so that it represents the reference measuring point itself; and
    a robot for positioning the body simulating element into the seat area and leaning against the backrest.

11. The device according to claim 10, further comprising, an additional sensor, providing measured values of forces (Fx, Fy, Fz) along axes of a three-dimensional Cartesian coordinate system and of torques (Mx, My, Mz) around the axes of the three-dimensional Cartesian coordinate system, which forces and torques are applied by the body simulating element against the kinematics of the robot.

12. The device according to claim 11, wherein the additional sensor is arranged between the robot and the body simulating element.

13. The device according to claim 11, further comprising an inclination sensor for verifying a predetermined angle of inclination of the backrest.

14. The device according to claim 11, wherein the body simulating element has shaped sections corresponding to thigh stumps, and wherein the shaped sections have assigned thereto respective receivers for simulation weights.

15. The device according to claim 14, further comprising means for presetting an angle of inclination of a back element of the body simulating element simulating a user's torso.

16. The device according to claim 15, wherein the means for presetting an angle of inclination are adapted to set the angle of inclination to be 25°±2°.

17. The device according to claim 11, further comprising an additional robot for seat adjustment.

* * * * *